United States Patent
Bourgois et al.

(10) Patent No.: US 10,443,850 B2
(45) Date of Patent: Oct. 15, 2019

(54) TURBOMACHINE COMBUSTION CHAMBER COMPRISING AN AIRFLOW GUIDE DEVICE OF SPECIFIC SHAPE

(71) Applicant: SAFRAN AIRCRAFT ENGINES, Paris (FR)

(72) Inventors: Sebastien Alain Christophe Bourgois, Saint Pierre du Perray (FR); Romain Nicolas Lunel, Montereau sur le Jard (FR); Clement Bernard, Moissy Cramayel (FR); Frederic Dos Santos, La Varenne Saint Hilaire (FR); Sebastien Loval, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 100 days.

(21) Appl. No.: 15/567,633

(22) PCT Filed: Apr. 21, 2016

(86) PCT No.: PCT/FR2016/050937
§ 371 (c)(1),
(2) Date: Oct. 19, 2017

(87) PCT Pub. No.: WO2017/013318
PCT Pub. Date: Jan. 26, 2017

(65) Prior Publication Data
US 2018/0051881 A1    Feb. 22, 2018

(30) Foreign Application Priority Data

Apr. 23, 2015    (FR) ..................................... 15 53657

(51) Int. Cl.
*F23R 3/10*    (2006.01)
*F23R 3/50*    (2006.01)
(Continued)

(52) U.S. Cl.
CPC .................. *F23R 3/16* (2013.01); *F23R 3/10* (2013.01); *F23R 3/28* (2013.01); *F23R 3/50* (2013.01); *Y02T 50/675* (2013.01)

(58) Field of Classification Search
CPC ...... F23R 3/04; F23R 3/10; F23R 3/28; F23R 3/286; F02C 3/103; F02C 3/05; F02C 3/08; F23C 7/008
See application file for complete search history.

(56) References Cited

U.S. PATENT DOCUMENTS 6,272,865 B1    8/2001  Clark et al.
8,661,829 B2 *  3/2014  Bourgois ............. F04D 29/441
                                               60/752
(Continued)

FOREIGN PATENT DOCUMENTS

FR    2 943 403 A1    9/2010
FR    2 964 725 A1    3/2012
GB      739 093 A    10/1955

OTHER PUBLICATIONS

International Search Report dated Sep. 7, 2016 in PCT/FR2016/050937 filed Apr. 21, 2016.
(Continued)

*Primary Examiner* — Gerald L Sung
*Assistant Examiner* — Todd N Jordan
(74) *Attorney, Agent, or Firm* — Oblon, McClelland, Maier & Neustadt, L.L.P.

(57) ABSTRACT

A combustion chamber for a turbomachine that includes a chamber end wall and a plurality of air and fuel injection systems distributed circumferentially about an axis of the combustion chamber. The combustion chamber includes, associated with each injection system, a guide device for guiding an airflow including at least one wall mounted on the injection system and projecting in the upstream direction, one wall acting as an obstacle to a circumferential flow
(Continued)

of air around the axis. The one wall of the guide device for guiding the airflow has a shape substantially defining a quarter of a spheroid the interior volume of which forms a guide scoop for guiding the airflow feeding the combustion chamber.

10 Claims, 2 Drawing Sheets

(51) Int. Cl.
*F23R 3/16* (2006.01)
*F23R 3/28* (2006.01)

(56) References Cited

U.S. PATENT DOCUMENTS

| | | | |
|---|---|---|---|
| 9,157,637 B2* | 10/2015 | Poyyapakkam | ........ F23R 3/002 |
| 2012/0055164 A1 | 3/2012 | Bourgois et al. | |
| 2013/0160452 A1 | 6/2013 | Bourgois et al. | |
| 2014/0345286 A1 | 11/2014 | Zupanc et al. | |

OTHER PUBLICATIONS

French Search Report dated Dec. 21, 2015 in FR 1553657 filed Apr. 23, 2015.

* cited by examiner

TURBOMACHINE COMBUSTION CHAMBER COMPRISING AN AIRFLOW GUIDE DEVICE OF SPECIFIC SHAPE

TECHNICAL FIELD

The present invention relates to the technical field of combustion engines equipping turbomachines, and more particularly to the field of air-supply means for such combustion chambers.

The invention applies to any type of land or aeronautical turbomachine, and in particular to aircraft turbomachines such as turbojet engines and turboprop engines.

It relates more precisely to a turbomachine combustion chamber comprising an airflow guide device having a specific shape in a quarter of a spheroid, and a turbomachine comprising such a combustion chamber.

PRIOR ART

Turbomachines in general comprise an annular combustion chamber mounted downstream of a compressor.

The combustion chamber is delimited upstream by an annular bottom equipped with injection systems evenly distributed around the axis of the turbomachine and intended for injecting a mixture of air or fuel into the combustion chamber.

These injection systems comprise peripheral piercings through which air coming from the compressor can enter, and means for aligning and guiding fuel injector heads. In addition, these injection systems are designed to optimise the performance of the combustion chamber and thus to reduce its fuel consumption and the emissions of pollutants discharged from this combustion chamber.

Furthermore, the outlet of the compressor emerges into an enclosure in which the combustion chamber is housed. The compressor may be of the axial type and comprise an outlet substantially aligned with the combustion chamber injection systems, or be of the centrifugal type and comprise at the outlet an annular diffuser emerging in a radially external region of the combustion chamber enclosure.

The performance of the injection system is in general higher, the more even the supply of air of the systems around their respective axes.

However, the outlet of the compressor being axially distant from the injection systems, the airflow coming from the compressor in general arrives at the injection systems being distributed heterogeneously around each injection system.

This problem is particularly sensitive in the case of a centrifugal compressor, the air outlet of which is not aligned with the combustion chamber injection systems.

This is because, in the case of a turbomachine equipped with a centrifugal compressor, the diffuser is situated off-centre with respect to the axis of the combustion chamber so that the supply to the chamber bottom by the air emerging from the diffuser becomes more difficult to control than in the case of a combustion chamber supplied by an axial compressor.

In particular, the off-centring of the diffuser then leads to considerable heterogeneities in supply to the injection systems, which give rise to a significant asymmetry of the thermodynamic fields in the flame tube. More precisely still, the lack of supply of air to the volutes, and in particular volutes in the pilot zone of the injection systems, results in obtaining a poor distribution of drops of fuel in the combustion chamber, then giving rise to high heterogeneities of the combustion in the flame tube.

This phenomenon has in particular been revealed for the points of slowed functioning of the turbomachine, from which the whole of the flow of fuel is injected at the pilot zone of the injection systems, but also exists for operating conditions of the turbomachine of the full throttle type. Moreover, if this phenomenon is present on the combustion chambers from which approximately 20% of the airflow issuing from the compressor passes through the injection systems, it is even more marked on the multipoint combustion chambers from which approximately 70% of the airflow passes through the injection systems.

So, such a phenomenon also causes drawbacks having a degradation of the polluting emission indices and the appearance of hotspots in the combustion chamber that may lead to local rises in temperature at the walls of the combustion chamber or the chamber deflector.

It must be noted that solutions have already been described in the prior art for attempting to remedy the non-uniformity of the air supply of a turbomachine combustion chamber, coming from a diffuser connected to the outlet of a centrifugal compressor. Thus the patent application FR 2 943 403 A1 of the Applicant describes the production of improved air supply means for a turbomachine combustion chamber, comprising an air collector mounted on the chamber bottom. In addition, the patent application US 2014/0345286 A1 also teaches the production of an airflow guide for supplying a turbomachine combustion chamber, fixed to the injection systems. Nevertheless, in these solutions of the prior art, the designs of the air collector and of the airflow guide are not sufficiently optimum in terms of efficacy of capture and conveying of the air issuing from the compressor, and in particular from the off-centre diffuser connected to the outlet of a centrifugal compressor, to supply the combustion chamber injection systems. In addition, these solutions are also not sufficiently suitable for facilitating the mounting/removal of the injection systems if needed. In particular, the axial and/or radial size of the devices proposed is not satisfactory and does not generally allow the easy engagement or disengagement of the injector of the main volute, the rotation of the injector between any diffuser and the cowling of the combustion chamber, or the discharge of the injector at the external casing without structural modification.

Moreover, for reasons of axial space requirement for example, some combustion chamber injection systems, in particular multipoint injection systems, may comprise elements specific to their functioning directly exposed to the airflow issuing from the compressor. It may in particular be a fuel return tube, present on a multipoint injection system, making it possible to recover the fuel used for cooling the multipoint cavity. In this case then, these specific elements may be vulnerable to any debris present in this airflow issuing from the compressor, and for example ejected by the diffuser in the case of a compressor of the centrifugal type.

DISCLOSURE OF THE INVENTION

Consequently there exists a need for proposing an improved solution making it possible to reduce, or even prevent, heterogeneities in the supply of air issuing from the compressor, in particular of the centrifugal type, of injection systems of the combustion engine of a turbomachine. There also exists a need to make it possible to protect any specific elements present on these injection systems, and useful to their functioning, from any debris contained in the airflow supplying the combustion chamber of the turbomachine.

Thus the aim of the invention is to at least partially remedy the requirements mentioned above and the drawbacks relating to the embodiments of the prior art.

Thus the subject matter of the invention, according to one of the aspects thereof, is a combustion chamber for a turbomachine, comprising a chamber end wall arranged at the upstream end of the combustion chamber and a plurality of air and fuel injection systems distributed circumferentially about an axis of the combustion chamber and mounted on the chamber end wall, the combustion chamber comprising, associated with each injection system, a guide device for guiding an airflow comprising at least one wall mounted on the injection system and projecting in the upstream direction, said at least one wall acting as an obstacle to a circumferential flow of air around the axis of the combustion chamber, characterised in that said at least one wall of the guide device for guiding the airflow has a shape substantially defining a quarter of a spheroid the interior volume of which forms a guide scoop for guiding the airflow feeding the combustion chamber.

"Spheroid" means an ellipsoid of revolution, that is to say a shape close to a sphere. In particular, it may be an oblate spheroid, that is to say of flattened form, or a true sphere.

By virtue of the invention, it may be possible to obtain a homogeneous air supply, coming from the compressor, for injection systems of the combustion chamber of a turbomachine. Thus, for example, in the case of a multipoint combustion chamber placed downstream of a centrifugal compressor, it may be possible to obtain a symmetrisation of the flows in the flame tube, which allows better distribution of the fuel in the combustion chamber giving rise to more homogeneous combustion (reduction in hotspots and improvement in terms of pollution). In addition, this symmetrisation may potentially make it possible to obtain better flame stabilisation, and therefore improved performance in terms of operability of the combustion chamber. Furthermore, the solution proposed may where applicable make it possible to form a protection for specific elements of the injection systems, such as a fuel return tube for example, against any debris, for example ingested debris or engine debris, present in the airflow supplying the combustion chamber, for example an airflow injected by the diffuser in the case of a centrifugal compressor.

The combustion chamber according to the invention may further comprise one or more of the following features taken in isolation or in all technically possible combinations.

Advantageously, said at least one wall of the device guiding the airflow may comprise a first edge and a second edge respectively lying in a first cutting plane and a second cutting plane substantially orthogonal to each other, the guide device being mounted on the injection system by means of the second edge of said at least one wall.

Moreover, the axis of the injection system may lie in the first cutting plane, the first edge then being intersected at its middle by the axis of the injection system and forming the upstream edge delimiting the air inlet opening of the airflow guide device.

Furthermore, said at least one wall of the airflow guide device may comprise at least one discharge orifice, in particular situated opposite the air inlet opening of the airflow guide device.

Such a discharge orifice may in particular be in the form of a hole pierced in said at least one wall of the airflow guide device. Advantageously, such a discharge orifice may, in particular for injection systems situated at the high point of the combustion chamber, facilitate the discharge of any water that may for example accumulate in the internal space forming the airflow guide scoop in the case of ingestion of water and/or hail, among other things.

In addition, the airflow guide device may be mounted on the air and fuel injector of the injection system. In particular, the airflow guide device may be brazed onto the air and fuel injector.

The airflow guide device may moreover be preferentially metal, being in particular chosen from metal alloys or superalloys, in particular based on nickel and alloyed with chromium and iron. In particular, the airflow guide device may be produced from Inconel625®, that is to say $NiCr_{22}Mo_9Nb$.

Moreover, the axial and/or radial space requirement, preferentially the axial and radial space requirement, of the airflow guide device may be substantially similar to that of the air and fuel injector of the injection system.

Furthermore, another subject matter of the invention, according to another of its aspects, is a turbomachine, characterised in that it comprises a combustion chamber as defined previously.

In particular, the turbomachine may comprise a centrifugal compressor, the output of which is connected to a radial diffuser, itself connected to a flow diverter emerging in a radially external region of an enclosure in which the combustion chamber is housed.

The combustion chamber and the turbomachine according to the invention may comprise any of the features stated in the description, taken in isolation or in all technically possible combinations with other features.

BRIEF DESCRIPTION OF THE DRAWINGS

The invention can be understood better from a reading of the following detailed description of a non-limitative example embodiment thereof, as well as from an examination of the schematic partial figures in the accompanying drawing, in which.

In all these figures, identical references can designate identical or similar elements.

In addition, the various parts depicted in the figures are not necessarily shown to a uniform scale, in order to make the figures more legible.

DETAILED DISCLOSURE OF A PARTICULAR EMBODIMENT

Throughout the description, it should be noted that the terms upstream and downstream are to be considered with respect to a main direction F of normal flow of the gases (from upstream to downstream) for a turbomachine 10. Moreover, the axis T of the combustion chamber 1 of the turbomachine 10 means the radial symmetry axis of the combustion chamber 1 of the turbomachine 10. The axial direction of the combustion chamber 1 of the turbomachine 10 corresponds to the rotation axis T of the combustion chamber 1 of the turbomachine 10. A radial direction of the combustion chamber 1 of the turbomachine 10 is a direction perpendicular to the axis T of the combustion chamber 1 of the turbomachine 10. Furthermore, unless stated to the contrary, the adjectives and adverbs axial, radial, axially and radially are used with reference to the aforementioned axial and radial directions. In addition, unless stated to the contrary, the terms internal and external are used with reference to a radial direction so that the internal part of an element is closer to the axis T of the combustion chamber 1 of the turbomachine 10 than the external part of the same element.

Figure 1:
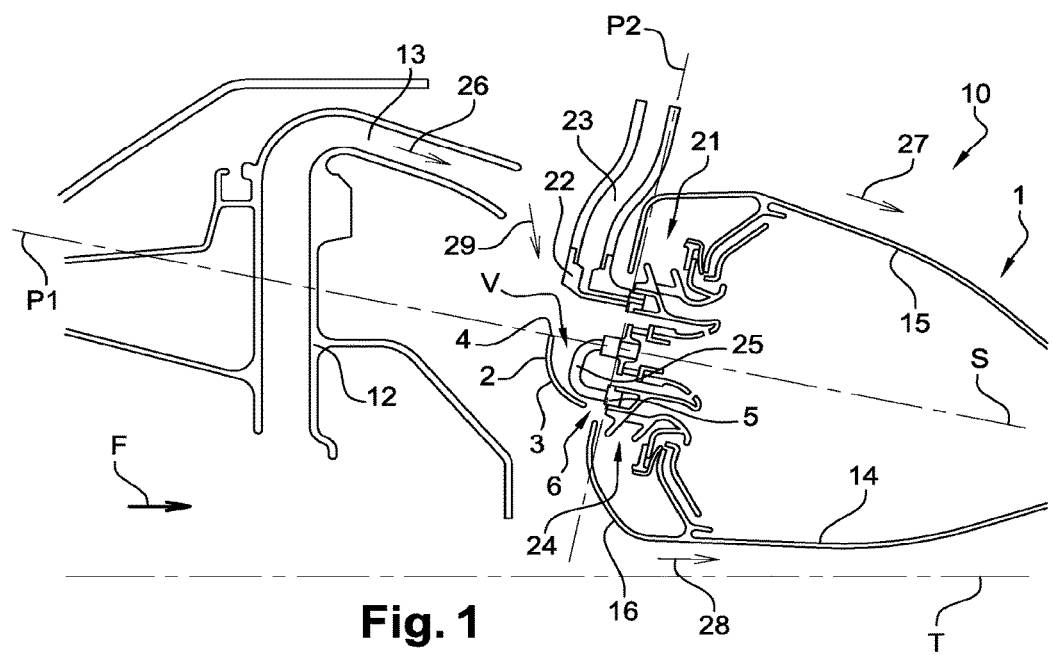
FIG. 1 shows partially, in axial section, an example of a turbomachine comprising a combustion chamber according to an example embodiment according to the invention.
Figure 2:
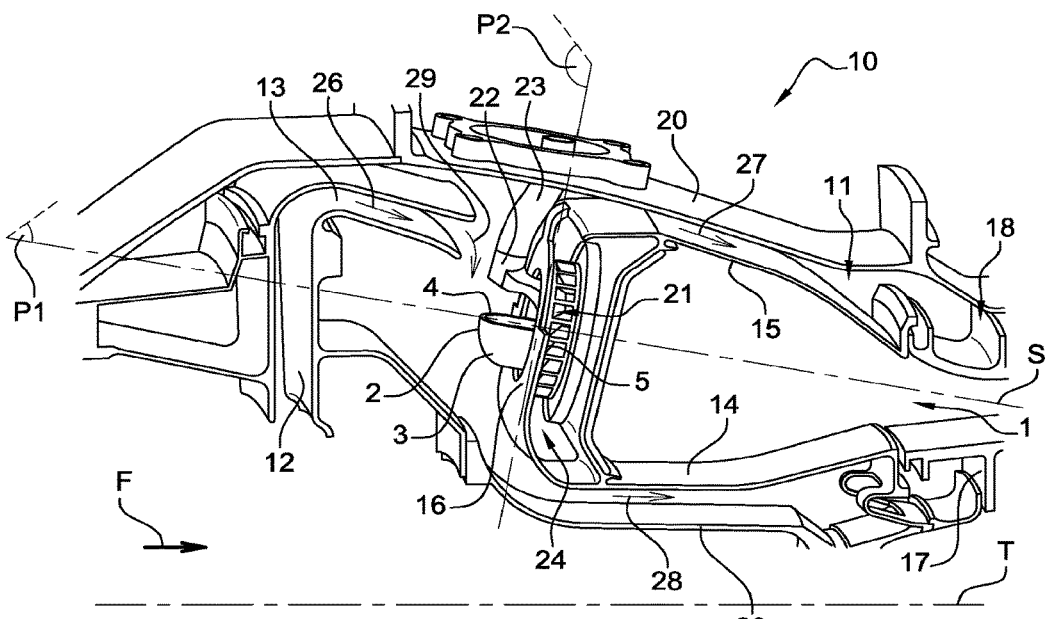
FIG. 2 shows partially, in perspective, the example of a turbomachine in FIG. 1.

With reference to FIGS. 1 and 2, these show schematically and partially an example embodiment of a turbomachine 10 comprising a multipoint combustion chamber 1 according to the invention.

More precisely, FIG. 1 shows, in axial section, the combustion chamber 1 of the turbomachine 10 with the immediate environment of this combustion chamber 1, and FIG. 2 shows, in perspective, the turbomachine 10 of FIG. 1.

In a known fashion, the combustion chamber 1 is housed in an enclosure 11 that is arranged downstream of a compressor of the turbomachine 10, of the centrifugal type, the output of which is connected to a radial diffuser 12, itself connected at the output to a flow diverter 13 that emerges in a radially external region of the enclosure 11 so that this diverter 13 is off-centre.

The combustion chamber 1 is delimited by two coaxial substantially cylindrical walls 14 and 15, respectively internal and external, and by an annular chamber end wall 16 that extends substantially radially at the upstream end of the combustion chamber 1 and is connected by its radial ends to the two walls 14 and 15.

The internal 14 and external 15 walls of the combustion chamber 1 are fixed downstream by two internal 17 and external 18 collars respectively to a substantially cylindrical internal wall 19 connected to the diffuser 12, and to an external casing 20, so as to delimit the enclosure 11.

Furthermore, multipoint injection systems 21, which are evenly distributed around the axis T of the combustion chamber 1, are mounted in the chamber end wall 16. Each injection system 21 comprises in particular a head 22 of a fuel injector 23, and air inlet orifices 24 arranged around an axis S of the injection system 21.

The injection systems 21 are configured so as to allow a certain radial and axial movement of the injector heads 22, in order to take account of any differential expansions of such a nature as to cause relative movements between the injectors 23 and the combustion chamber 1.

Moreover, as can be seen in FIG. 1, each injection system 21 comprises a fuel return tube 25, this then making it possible to recover the fuel used for cooling the multipoint cavity of the combustion chamber 1.

In operation, an airflow 26 coming from the centrifugal compressor is brought by the diverter 13 into the enclosure 11.

The airflow 26, which arrives in a radially external region of the enclosure 11, is separated globally into three parts in this enclosure 11.

A first part 27 of the airflow flows downstream along the external wall 15 of the combustion chamber 1, and partially enters the combustion chamber 1 through orifices (not shown) formed in its external wall 15.

A second part 28 of the airflow flows downstream along the internal wall 14 of the combustion chamber 1, and partially enters the combustion chamber 1 through orifices (not shown) formed in its internal wall 14.

Finally, a third part 29 of the airflow supplies the injection systems 21 of the combustion chamber 1.

In accordance with the invention, the combustion chamber 1 is equipped with a plurality of devices 2 for guiding the airflow 29, one of which is visible in FIGS. 1 and 2.

Preferentially, this device 2 guiding the airflow 29 is produced from metal, in particular from metal alloys or superalloys, being for example produced from Inconel625®, that is to say $NiCr_{22}Mo_9Nb$.

In this example embodiment, the device 2 guiding the airflow 29 is produced in a single piece, and thus comprises a wall 3 mounted on the injector 23 of the injection system 21, in particular by brazing. This wall 3 is projected in the upstream direction and forms an obstacle to a circumferential flow of air around the axis T of the combustion chamber 1.

Figure 3:
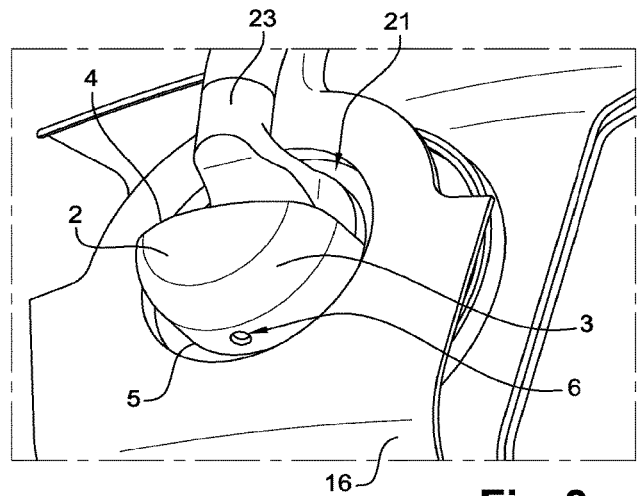
FIG. 3 shows, in perspective, a detail of FIG. 2 showing the airflow guide device of the combustion chamber according to the invention.

FIG. 3 shows, in perspective, a detail of FIG. 2 showing more precisely the device 2 guiding the airflow 29 of the combustion chamber 1 of the turbomachine 10.

As can be seen in FIGS. 1 to 3, the wall 3 of the device 2 guiding the airflow 29 has a particular form, making it possible to obtain guidance of the airflow 29 in the direction of the pilot zone of the multipoint injection system 21. More precisely, the wall 3 of the device 2 guiding the airflow 29 has a form defining substantially a quarter of a spheroid, and in particular an oblate spheroid with a shape close to that of a sphere, the internal volume V of which forms a scoop for guiding the airflow 29 for supplying the combustion chamber 1.

More precisely again, as can be seen in FIG. 2 in particular, the wall 3 of the device 2 guiding the airflow 29 comprises a first edge 4 and a second edge 5 respectively lying in a first cutting plane P1 and a second cutting plane P2 substantially orthogonal to each other.

The guide device 2 is then mounted, in particular by brazing, on the injector 23 of the injection system 21 by means of the second edge 5 of the wall 3.

In addition, the axis S of the injection system 21 lies in the first cutting plane P1, so that the first edge 4 is then intersected at its middle by the axis S of the injection system 21 and forms the upstream edge delimiting the air inlet opening of the device 2 guiding the airflow 29, for the entry of the air coming from the diverter 13.

In this way, the device 2 guiding the airflow 29 makes it possible to significantly reduce heterogeneities in supply of the pilot zone of the multipoint injection system 21. In particular, the form of the wall 3 of the device 2 guiding the airflow 29 is then optimised in order to achieve a substantially homogeneous air supply of the pilot zone of the multipoint injection system 21.

Moreover, the guide device 2 also makes it possible to constitute effective protection of the fuel return tube 25 of the injection system 21, so that it is correctly protected against any debris that may be projected by the diverter 13.

Furthermore, as can be seen in particular in FIG. 3, the wall 3 of the device 2 guiding the airflow 29 comprises, opposite to the air inlet opening of the device 2 guiding the airflow 29, a discharge orifice 6, in the form of a pierced hole, which facilitates the discharge of any water that may for example accumulate in the internal volume V forming the airflow guide scoop in the case of ingestion of water and/or hail.

Figure 4:
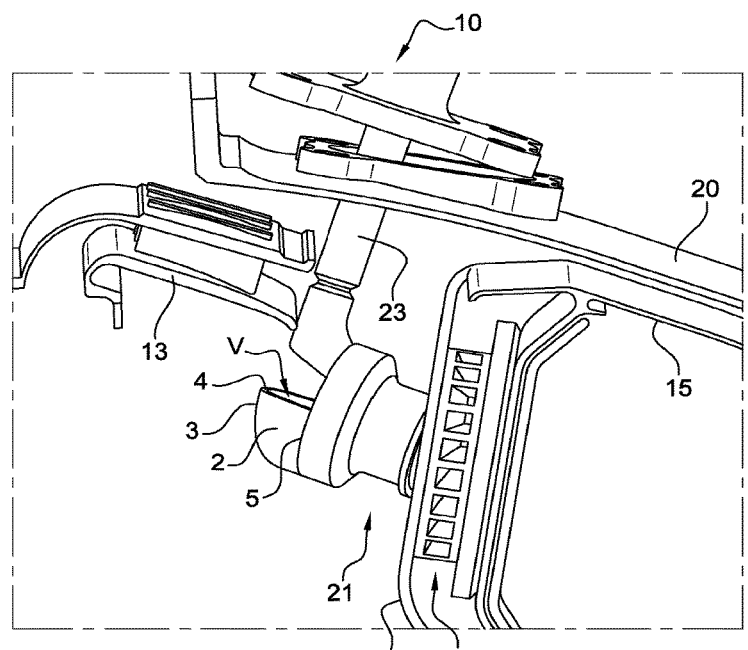
FIG. 4 illustrates partially, in perspective, the dismantling of an injector equipped with an airflow guide device with respect to the chamber bottom of the combustion chamber in FIG. 2.

Moreover, FIG. 4 illustrates partially, in perspective, the dismantling of the injector 23 from the injection system 21, equipped with the device 2 guiding the airflow 29, with respect to the chamber end wall 16 of the combustion chamber 1.

As can be seen in this FIG. 4, the axial and radial space requirement of the device 2 guiding the airflow 29 is similar to that of the injector 23 of the injection system 21. In this way, the device 2 guiding the airflow 29 has the particularity of being removable and not preventing the removal of the injector 23.

Comparative performance tests between the combustion chamber 1 according to the prior art, not equipped with the guide device 2 as described above, and a combustion chamber 1 according to the invention equipped with such a device 2 for guiding the airflow 29, made it possible to reveal the advantages procured by the invention, namely: homogenisation of the temperature field in the combustion chamber 1, reduction in the carbon monoxide (CO) production zones, and especially a resymmetrisation of the flows making it possible to obtain a more homogeneous velocity field in the combustion chamber 1 and an extension of the recirculation zones, and thus better flame stabilisation.

Thus, in general terms and as explained previously, the devices 2 guiding the airflow 29 of the combustion chamber 1 according to the invention make it possible to channel the airflow 29 supplying the injection systems 21 around each of these systems, which makes it possible to make the air supply of these systems more homogeneous. The result is thus an improvement in the general performances of the combustion chamber 1, and more particularly an increase in its efficiency and a reduction in the emission of pollution systems by the combustion chamber 1.

Naturally the invention is not limited to the example embodiment that has just been described. Various modifications can be made thereto by a person skilled in the art.

The invention claimed is:

1. A combustion chamber for a turbomachine, comprising a chamber end wall arranged at the upstream end of the combustion chamber and a plurality of air and fuel injection systems distributed circumferentially about an axis of the combustion chamber and mounted in the chamber end wall, the combustion chamber further comprising, associated with each injection system, a guide device for guiding an airflow comprising at least one wall mounted on the injection system and projecting in the upstream direction, said at least one wall acting as an obstacle to a circumferential flow of air around the axis of the combustion chamber,
wherein said at least one wall of the guide device for guiding the airflow has a shape defining a quarter of a spheroid the interior volume of which forms a guide scoop for guiding the airflow feeding the combustion chamber.

2. The combustion chamber according to claim 1, wherein said at least one wall of the guide device comprises a first edge and a second edge respectively lying in a first cutting plane and a second cutting plane orthogonal to each other, the guide device being mounted on the injection system by the second edge of said at least one wall.

3. The combustion chamber according to claim 2, wherein an axis of the injection system lies in the first cutting plane, the first edge then being intersected at a middle of the first edge by the axis of the injection system and forming the upstream edge delimiting an air inlet opening of the guide device.

4. The combustion chamber according to claim 1, wherein said at least one wall of the guide device comprises at least one discharge orifice, situated opposite an air inlet opening of the guide device.

5. The combustion chamber according to claim 1, wherein the guide device is mounted on an air and fuel injector of the injection system.

6. The combustion chamber according to claim 5, wherein the guide device is brazed onto the air and fuel injector.

7. The combustion chamber according to claim 1, wherein the guide device is metal.

8. The combustion chamber according to claim 1, wherein the axial and/or radial space requirement of the guide device is similar to that of an air and fuel injector of the injection system.

9. A turbomachine, comprising the combustion chamber according to claim 1.

10. The turbomachine according to claim 9, further comprising a centrifugal compressor, the output of which is connected to a radial diffuser, the radial diffuser being connected to a flow diverter emerging in a radially external region of an enclosure wherein the combustion chamber is housed.

* * * * *